United States Patent [19]

Muramatsu

[11] Patent Number: 4,775,205
[45] Date of Patent: Oct. 4, 1988

[54] LIGHT-BEAM SCANNING APPARATUS HAVING TWO BEAM WAISTS

[75] Inventor: Toshio Muramatsu, Hino, Japan

[73] Assignee: Konishiroku Photo Industry Co., Ltd., Tokyo, Japan

[21] Appl. No.: 27,109

[22] Filed: Mar. 13, 1987

Related U.S. Application Data

[63] Continuation of Ser. No. 810,827, Dec. 18, 1985, abandoned, which is a continuation of Ser. No. 726,947, Apr. 26, 1985, abandoned, which is a continuation of Ser. No. 437,337, Oct. 28, 1982, abandoned.

[30] Foreign Application Priority Data

Oct. 31, 1981 [JP]  Japan ................................. 56-175541

[51] Int. Cl.$^4$ ............................................. G02B 26/10
[52] U.S. Cl. ........................................ 350/6.8; 350/6.5
[58] Field of Search ................................. 350/6.5–6.8, 350/320

[56] References Cited

U.S. PATENT DOCUMENTS 4,294,506 10/1981 Hattori ................................. 350/6.8

FOREIGN PATENT DOCUMENTS

50334 4/1979 Japan ..................................... 350/6.8

*Primary Examiner*—Jon W. Henry
*Attorney, Agent, or Firm*—Jordan B. Bierman

[57] ABSTRACT

A light beam scanning apparatus including a light source for emitting a light beam and a rotatable polygon mirror having at least one surface for reflecting the light beam to a second surface being scanned. A flat field lens is provided between the polygon mirror and the second surface and an optical system is provided close to the second surface. The optical system has a light converging effect only in the vertical direction perpendicular to the scanning direction, and the light beam forms a first beam waist between the flat field lens and the optical system, and a second beam waist substantially on the second surface.

18 Claims, 8 Drawing Sheets

LIGHT-BEAM SCANNING APPARATUS HAVING TWO BEAM WAISTS

This application is continuation of application Ser. No. 810,827, filed Dec. 18, 1985 now abandoned, which is in turn a continuation of application Ser. No. 726,947 filed Apr. 26, 1985 now abandoned which is in turn a continuation of application Ser. No. 437,337 filed Oct. 28, 1982 now abandoned.

BACKGROUND OF THE INVENTION

The present invention relates to a light-beam scanning apparatus in which a light-beam emitted from a light source is reflected by a rotatable polygon mirror and is then applied to a surface being scanned through a flat field lens, and a scanning is thus operated.

Figure 1:
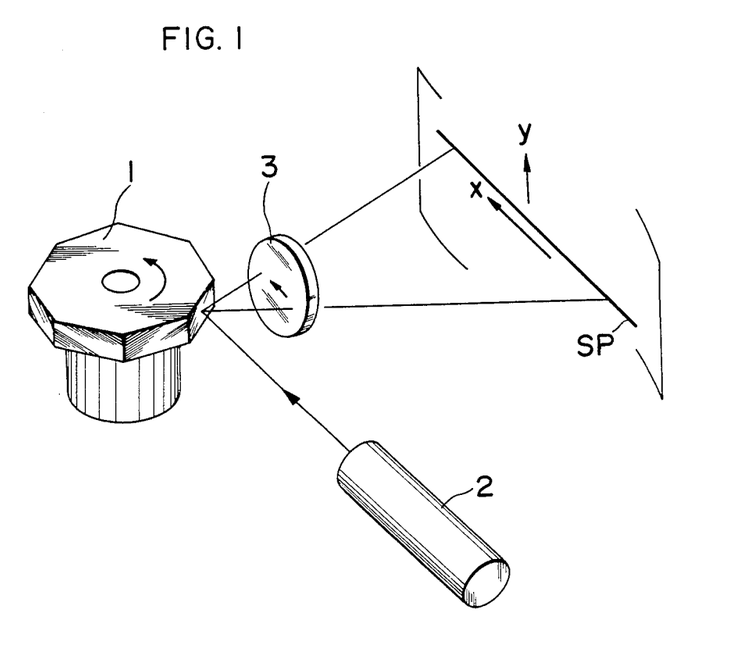
FIG. 1 is a basic constitutional illustration of the substantial portion of a light-beam scanning apparatus.
Figure 2:
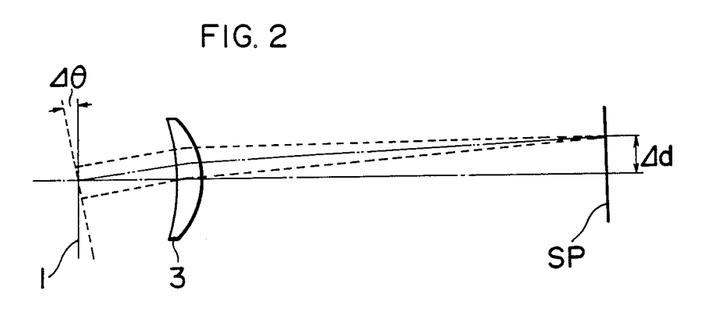
FIG. 2 is a descriptive view of a tilting angle error.
Figure 3:
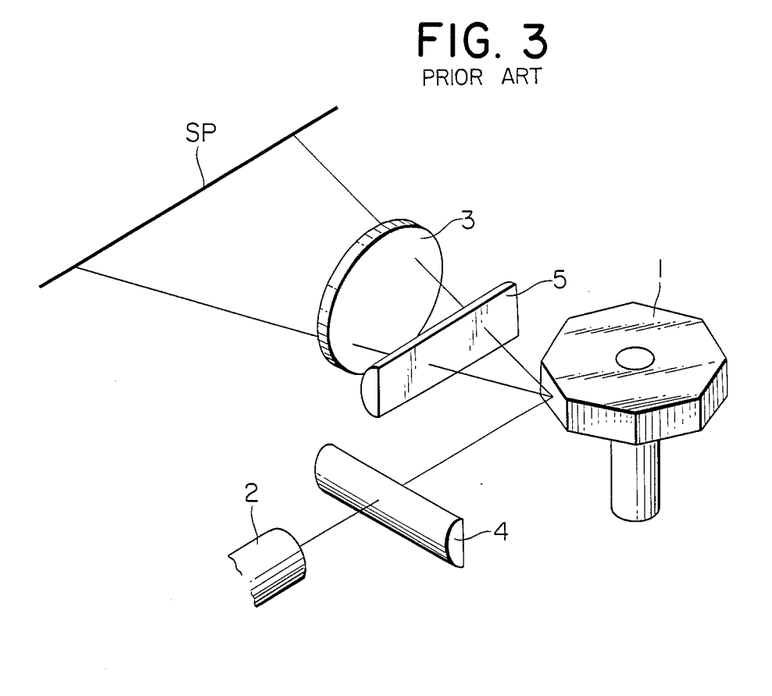
Figure 4:
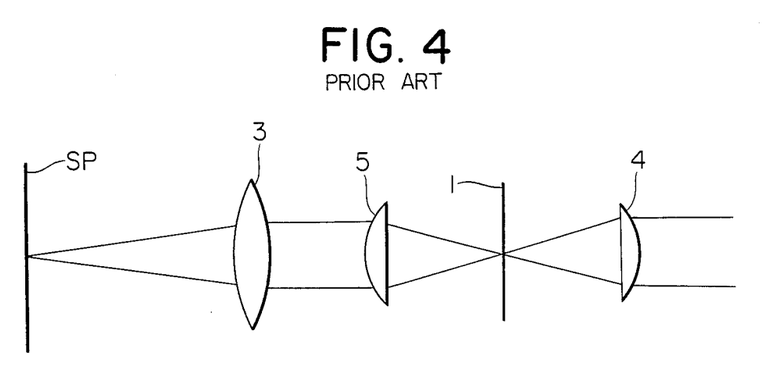

In the light-beam scanning apparatus of this kind, as shown schematically in FIG. 1, there have originally been constituted as that a light-beam emitted from laser 2 to the rotatable polygon mirror 1 is reflected by each of the mirror surfaces of the rotatable polygon mirror 1 rotating in the direction of the arrow and then the light-beam is focused to make a light-spot moving over surface being scanned SP through f·θ lens 3 at a constant speed in the scanning direction, namely, the direction of x. However, if the mirror surfaces are not in parallel with each other to the rotating axle of the ratatable polygon mirror 1 and the angles of mirror setting are disordered, that is referred to as a tilt angle error, then the light-spot is not shifted uniformly in the direction y that is at right angles to the scanning direction. For example, if there is a tilt angle error of $\Delta\theta$ as shown in FIG. 2, then the shifting of $\Delta d = 2f \cdot \Delta\theta$ in which f represents a focal length of f·θ lens 3 is to be caused on surface being scanned SP. Such tilt angle error or the chattering vibration of the rotating axle will cause the pitch of scanning line into disorder, so that some countermeasure must be taken. As for one of such countermeasures, it may be considered that such tilt angle error is minimized by improving accuracy of production, however, there are problems that the steps of production will be increased, the mas-production thereof is hardly feasible and the cost will be expensive even if the production can be made accurately, because the accuracy of the production has in fact been nearly maximized. There has also been so far such a countermeasure as shown in FIG. 3 and FIG. 4 respectively, in which a light-beam is made a one directionally converged ray upon the rotatable polygon mirror 1 in form of a linear beam in parallel to the scanning direction by means of a cylindrical lens 4, and a tilt angle error is then compensated by the optical conjugation of the linear beam and a scanning position with respect to the direction being at right angles to the scanning direction through a cylindrical lens (or a toroidal lens) 5 and the flat field lens 3 both arranged between the rotatable polygon mirror 1 and surface being scanned SP, the countermeasure has been disclosed in U.S. Pat. No. 3,750,189. However, the other problems are newly caused that a uniform spot size is hardly obtainable extending over the entire scanning area in the case of using the cylindrical lens 5 (The reason is that a practical focal distance is shorter when the light-beam is incident diagonally to the flat field lens.), and that in case of using the toroidal lens in place of the cylindrical lens 5 a uniform spot size will be obtainable but the cost of such light-beam scanning apparatus would be expensive because of the expensiveness of such the toroidal lens.

Figure 5:
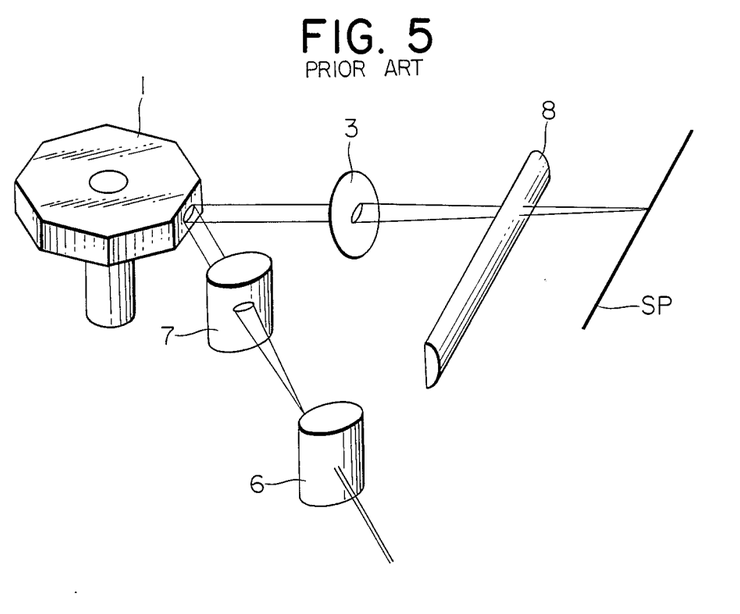
Figure 6:
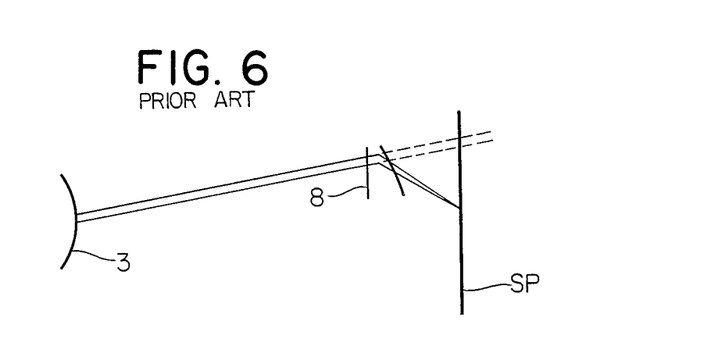
Figure 7:
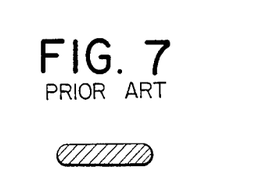

Further, there has also been another conventional example as shown in FIG. 5 and FIG. 6, respectively, wherein flat and nearly parallel light-beams, among which a flat light-beam is shown in FIG. 7, are made an incident rays upon rotatable polygon mirror 1, and cylindrical lens 8 is simply arranged between flat field lens 3 and surface being scanned SP. In this device, there is also a problem that a uniform spot size is hardly obtainable extending over the entire scanning area.

Figure 13:
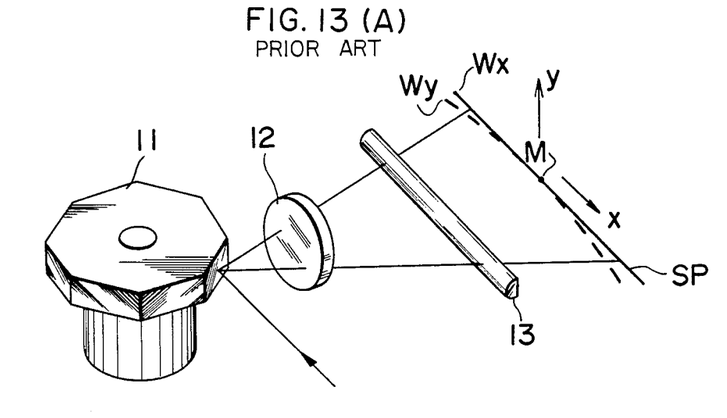

FIG. 13(A) illustrates the state described above. Wherein, the reflecting surfaces of rotatable polygon mirror 11 and middle point M on a surface to be scanned are in the relation of conjugation with respect to direction y in the optical system comprising flat field lens 12 and cylindrical lens 13. When a luminous flux is led in through the optical system so as not to produce a light-beam in direction y between flat field lens 12 and cylindrical lens 13, the trajectory of the light-beam becomes linear Wx in direction x while that is curve Wy in direction y. Consequently, the configuration of each spot on the surface to be scanned will become greatly varied in the diameter thereof in the middle of and at the both ends of each scanning line, as shown in FIG. 13(b). In the state like the above, such an infavorable phenomenon as the lowering of the resolving power at every scanning end is taken place. The problem of this kind may be solved by making use of such a toroidal lens 21 being curved in direction x as shown in FIG. 13(c), but a lens in such configuration is more seriously disadvantageous than a simple cylindrical lens is from the viewpoint of the manufacture processes and there will incidentally cause another defect in the former that the optical system thereof will be relatively expensive.

SUMMARY OF THE INVENTION

The present invention has been devised, taking the above-mentioned problems into consideration, in order to embody a light-beam scanning apparatus in which a light-beam emitted from a light source is reflected by a rotatable polygon mirror and a surface being scanned is irradiated with the reflected light beam through a flat field lens; said light-beam scanning device characterized in that a light-beam shaping means is arranged between said light-source and said rotatable multi-mirror; said light-beam shaping means aligns light-beams which are wide and flat in the scanning direction and are also nearly in parallel to each other and said means gives necessary curvature of wavefront and a diameter of light beam to direction of x and y; and that an optical element is provided in the vicinity of said surface being scanned, so as to have a light convergent effect only in the direction being at right angles to the scanning direction, and further that the reflection surfaces of said rotatable polygon mirror and said surface being scanned are so constituted as to be in a conjugational relation geometric opticswise to each other, and still further that it is constituted to produce a primary beam-waist between said flat field lens and said optical element and a secondary beam-waist in the vicinity of said surface being scanned, and thereby the light-beam scanning device constructed simply and inexpensively has been materialized and a uniform spot size can be obtained all over the scanning area and any disorder of the equal pitch of scanning lines cannot be produced.

BRIEF DESCRIPTION OF THE DRAWINGS

FIGS. 3–7 and 13a, b and c are the descriptive views of conventional type devices, respectively;

FIGS. 8 a–c is a constitutional illustration of a light-beam scanning apparatus of the present invention;

FIGS. 9, 10a & b–11a & b are the descriptive views of a beam-shaping means; and

DETAILED DESCRIPTION OF THE PREFERRED EMBODIMENTS

Figure 8:
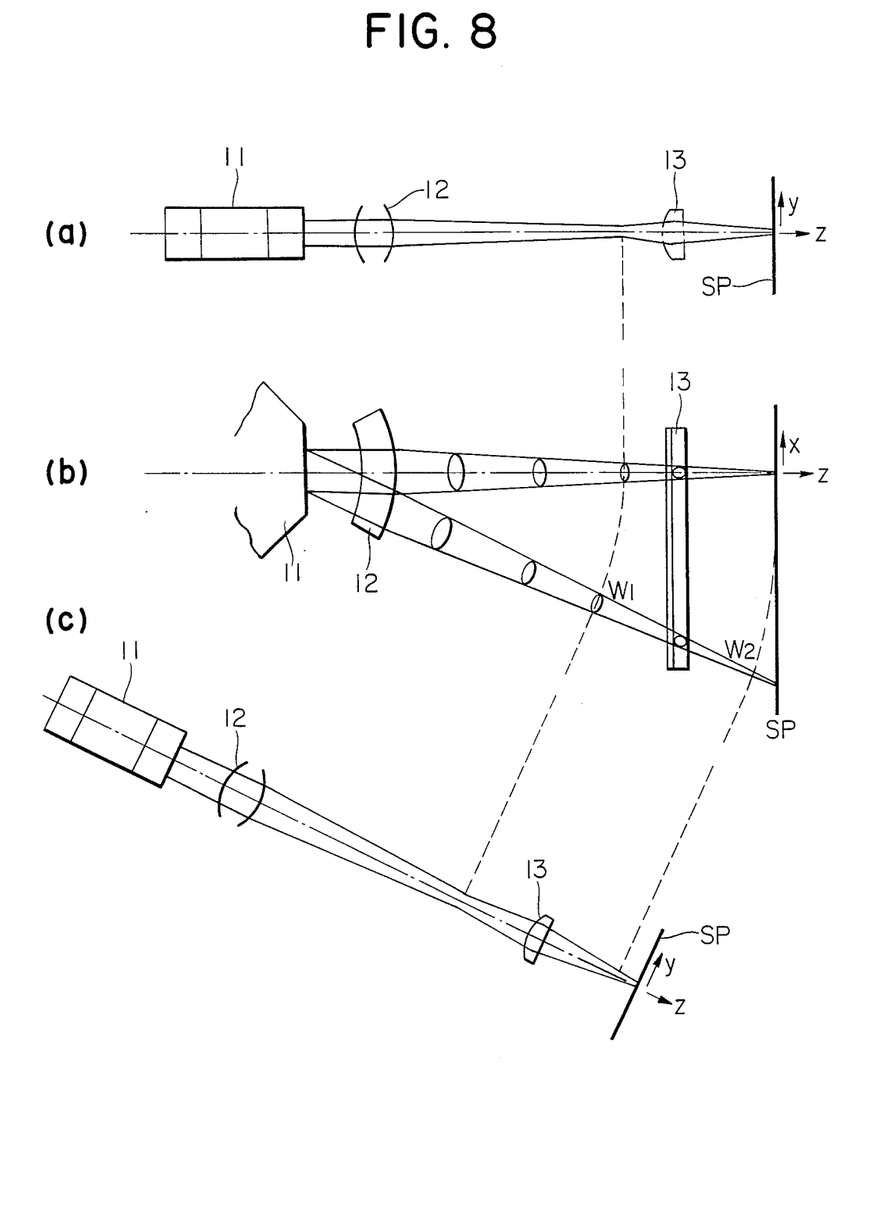

Now, referring to the details of the present invention, FIG. 8 shows a schematic constitutional illustration of light-beam and the optical system between a rotatable polygon mirror and a surface being scanned in a light-beam scanning apparatus according to the present invention, wherein FIG. 8(b) is the top plan view thereof; FIG. 8(a) is a side view seen at the center of scanning range; FIG. 8(c) is a side view seen at a scanning end, and in the figures, numeral 11 designates a rotatable polygon mirror in which light beam is given desirable curvature of wavefront and diameter of the light beam to the direct of x and y is fallen onto the reflectors i.e.; the mirror faces of the rotatable polygon mirror from a light-beam shaping means. Numeral 12 is a flat field lens (a f·θ lens is used in the figure) receiving the reflected beams from rotatable polygon mirror 11; and 13 is a cylindrical convex lens arranged in the vicinity of surface being scanned SP that is ordinarily plane. The cylindrical convex lens 13 is one of optical elements having a one-directionally converging effect, that is, a lens having a refraction property to only the direction y being at right angles to scanning direction x.

In the device according to the invention, the reflectors of rotatable polygon mirror 11 and the surface being scanned SP are in a geometric conjugational relation to each other. A light-beam passing through flat field lens 12 and being on the way to the center of the scanning span has primary beam waist $W_1$ with respect to the direction y on this side of cylinder lens 13, while the light-beam is converged in the direction x uniformly from flat field lens 12 to surface being scanned SP, and thereafter the light-beam again diversing in the direction y produces a secondary beam waist after passing through cylindrical lens 13 so as to have a desired beam size on surface being scanned SP. Now, as the light-beam being deflected by rotatable polygon mirror 11 moves from the center of the scanning span to the end thereof, the primary beam-waist in the y direction draws an arc and the diameter of the light beam flux in the y direction at the incident point to cylindrical lens 13 will become relatively larger than that in the center of the scanning span. In addition the practically effective focal distance of the cylindrical lens 13 will be shortened by a slantly incident light-beam, therefore, as the light-beam separates from the center of the scanning span, the secondary beam-waist of the light-beam in y direction will move in front of surface being scanned SP, as the result the diameter of the secondary beam-waist at the position where the beam-waist is to come will become relatively smaller than that in the center of the scanning span. The light-beam having passed through the secondary beam-waist in y direction will diverge in the y direction and then the diameter of the light beam thereof is increased slightly and made incident upon the surface being scanned.

Hereupon, if there suitably determine the factors such as the relative positions of the rotatable polygon mirror 11, the flat field lens 12, the cylindrical lens 13 and surface being scanned SP, the focal distance of each lens, the diameter of an incident light-beam upon the system to be determined, a radius of curvature of wavefront and the like, it should be possible to nearly uniform the diameters of spots in the y direction extending over the entire scanning span on a surface being scanned SP.

There are given the following relational formulae referrable to the conditions of a light-beam convergence or divergence, or to the desired spots to be obtainable by pursuing a light-beam, provided therein that a laser beam is used for a light-source and that the light-intensity distribution in a light-beam is of a Gauss type:

$$\omega = \omega_0 \sqrt{1 + \left(\frac{\lambda Z}{\pi \omega_0^2}\right)^2} \quad (1)$$

$$R = Z \left\{ 1 + \left(\frac{\pi \omega_0^2}{\lambda Z}\right)^2 \right\} \quad (2)$$

Wherein, in a beam-waist, a light-beam whose wavelength is $\lambda$ and radius is $\omega_0$ that is defined as depended upon a position where the intensity of the light-beam becomes $1/e^2$ of the intensity of the center, the light-beam gives radius $\omega$ and wavefront radius R of curvature at the position separating by distance Z from the beam-waist. To the contrary, if radius $\omega$ and radius R of a wavefront curvature of a light-beam are given, it is then possible to obtain distance $Z_0$ and radius $\omega_0$ of a light beam at a beam-waist, in accordance with the following formulae:

$$Z_0 = \frac{R}{1 + \left(\frac{\lambda R}{\pi \omega^2}\right)^2} \quad (3)$$

$$\omega_0 = \frac{\omega}{\sqrt{1 + \left(\frac{\pi \omega^2}{\lambda R}\right)^2}} \quad (4)$$

According to Formula (3), it can be found that a beam-waist will take place on this side of focal point of geometrical optics when R is larger and $\omega$ is smaller, because $Z_0 = R$; geometrical optics. And, an incident light-beam upon an optical element having a refractive property such as a lens will be changed only in its radius of curvature of wavefront on a refracted surface, as expressed in the following formula:

$$n\left(\frac{1}{r} - \frac{1}{S}\right) = n'\left(\frac{1}{r} - \frac{1}{S'}\right) \quad (5)$$

Wherein, n, n' each represent the refractive index of media across a refractive surface, respectively; r represents the radius of the curvature of a refractive surface; and S, S' each represent the radius of a wavefront curvature. Besides, an approximate calculation is possible in the following formula in which focal distance f of a lens is used, in place of Formula (5):

$$\frac{1}{S} + \frac{1}{S'} = \frac{1}{f} \qquad (6)$$

As described above, the conditions of convergence, divergence and the like of a light-beam emitted from a laser can be recognized from Formulae (1) through (6), and it is possible to plan the optical system.

Now, the important point is, in Formula (3), that a geometrical-opticswise convergent point of light and a waveopticswise convergent point thereof are not coincident with each other. The actual convergent point is determined waveopticswise while the geometrical-optics will determine the travelling direction of such light beam.

The present invention has been attained from the result of utilizing such properties as mentioned above. To be more concrete, in FIG. 8, surface to be scanned SP and the reflecting surfaces of rotatable polygon mirror 11 are conjugated geometrical to each other, but it is still possible to produce two beam-waists, one of which is in the vicinity of the surface to be scanned and the other of which between flat field lens 12 and cylindrical lens 13. It is, therefore, possible to obtain the spot diameters in a uniform size on the surface to be scanned ultimately by selecting a suitably constituted optical system and by utilizing the good effect that $W_2$ will become relatively smaller at the scanning ends than in the middle of the scanning area, and also by keeping the effect on compensating the scanning line pitches disorderd by the conjugation relation mentioned above.

As for the conditions for obtaining the uniformity of spots that is defined as that the configuration of the spots should not always be of real circle but may also be of ellipse, and the configuration thereof should be uniform extending over the scanning direction, it is required that the distance between cylindrical lens 13 and a surface being scanned SP is regulated by the desired diameter of each spot and also that the cylindrical lens 13 should be closer to the surface being scanned SP as the diameter of each spot is getting smaller.

Next, some of the concrete examples are given below:

EXAMPLE 1

Light source: He-Ne laser
Flat field lens: f=350 mm. (f·θ lens)
Cylindrical lens: f=10 mm.
Cylindrical lens: Distance to a surface being scanned = 10.21 mm.
Incident light beam upon a rotatable polygon mirror:
 Radius of a light beam in the direction of y: 0.420 mm.
 Radius of a wavefront curvature in the direction of y: 5739 mm.

| Deflection Angle made by rotatable polygon mirror | Radius of Primary beam-waist in the direction of y. | Radius in the direction of y, in a cylindrical lens. | Radius of Secondary beam-waist in the direction of y. | Radius in the direction of y, at the incident point on a surface being scanned. |
| --- | --- | --- | --- | --- |
| 0° | 0.155 mm | 0.165 mm | 0.0125 mm | 0.0125 mm |
| 5° | 0.155 mm | 0.165 mm | 0.0125 mm | 0.0125 mm |
| 10° | 0.156 mm | 0.166 mm | 0.0124 mm | 0.0125 mm |
| 15° | 0.157 mm | 0.167 mm | 0.0123 mm | 0.0130 mm |

-continued

| Deflection Angle made by rotatable polygon mirror | Radius of Primary beam-waist in the direction of y. | Radius in the direction of y, in a cylindrical lens. | Radius of Secondary beam-waist in the direction of y. | Radius in the direction of y, at the incident point on a surface being scanned. |
| --- | --- | --- | --- | --- |
| 20° | 0.159 mm | 0.169 mm | 0.0121 mm | 0.0141 mm |

EXAMPLE 2

Light source: He-Cd laser (441.6 nm)
Flat field lens: f=350 mm (f·θ lens)
Cylindrical lens: f=44.41 mm
Distance between cylindrical lens and a surface being scanned: 48.88 mm
Incident light beam upon a rotatable polygon mirror:
 Radius of light beam in the direction of y: 0.260 mm
 Radius of wavefront curvature in the direction of y: 1090 mm

| Deflection Angle made by rotatable polygon mirror | Radius of primary beam-waist in the direction of y. | Radius in the direction of y, in a cylindrical lens. | Radius of Secondary beam-waist in the direction of y. | Radius in the direction of y, at the incident point on a surface being scanned. |
| --- | --- | --- | --- | --- |
| 0° | 0.1453 mm | 0.1764 mm | 0.040 mm | 0.040 mm |
| 5° | 0.1455 mm | 0.1767 mm | 0.040 mm | 0.040 mm |
| 10° | 0.1461 mm | 0.1776 mm | 0.039 mm | 0.039 mm |
| 15° | 0.1472 mm | 0.1791 mm | 0.039 mm | 0.039 mm |
| 20° | 0.1487 mm | 0.1813 mm | 0.038 mm | 0.039 mm |

By contrast with the abovegiven examples, the characteristics of conventional type of the device not having any primary beam-waist between the flat field lens and cylindrical lens thereof are as follows:

Light source: He-Ne laser (632.8 nm)
Incident luminous flux upon a rotatable polygon mirror:
 Radius of flat field in the direction of y: 0.301 mm
 Radius of wavefront curvature in the direction of y= −356.74 mm (that is, the beam-waist is in front of the rotatable polygon mirror)
Flat field lens: f=350 mm (f·θ lens)
Cylindrical lens: f=50 mm
Distance between cylindrical lens and a surface being scanned: 56.52 mm

| Deflection Angle made by rotatable mirror | Radius in the direction of y, in a cylindrical lens. | Radius of a beam-waist in the direction of y, produced between a cylindrical lens and a surface being scanned. | Radius in the direction of y, at the incident point on a surface being scanned. |
| --- | --- | --- | --- |
| 0° | 0.651 mm | 0.0175 mm | 0.0175 mm |
| 5° | 0.651 mm | 0.0175 mm | 0.0175 mm |
| 10° | 0.648 mm | 0.0175 mm | 0.0192 mm |
| 15° | 0.651 mm | 0.0173 mm | 0.0246 mm |
| 20° | 0.646 mm | 0.0173 mm | 0.0348 mm |

As is obvious from the above data, the device of the present invention are markedly superior to any of the conventional devices, especially in the radius of the light beam at an incident point on a surface being scanned. Actually, the optical system of a conventional device was served as a main scanning means and a photographic paper was attached to a table moving at a constant speed and thus a character recording was tried thereonto, and it was consequently found that an excellent recording was resulted around the center of the scanning area but on the ends of the scanning area the deteriorations such as a thickened line, image break and the like were produced. On the contrary, with the optical system of Example 1, an excellent recording was performed extending over the entire span of scanning. Also, with the optical system of Example 2 to serve as the exposure system, the recording was tried on an electrophotographic system, then an excellent recording was performed extending over the entire span of scanning.

Figure 9:
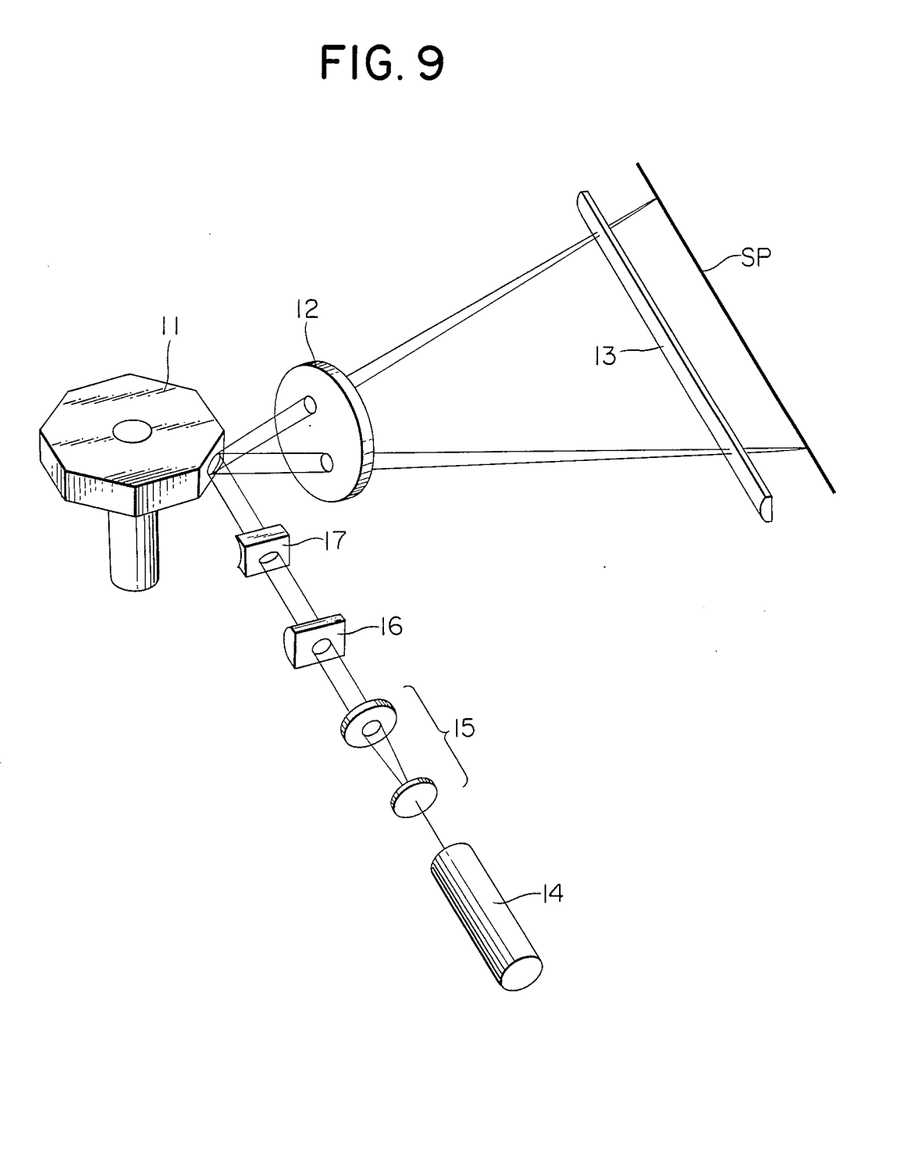
Figure 10:
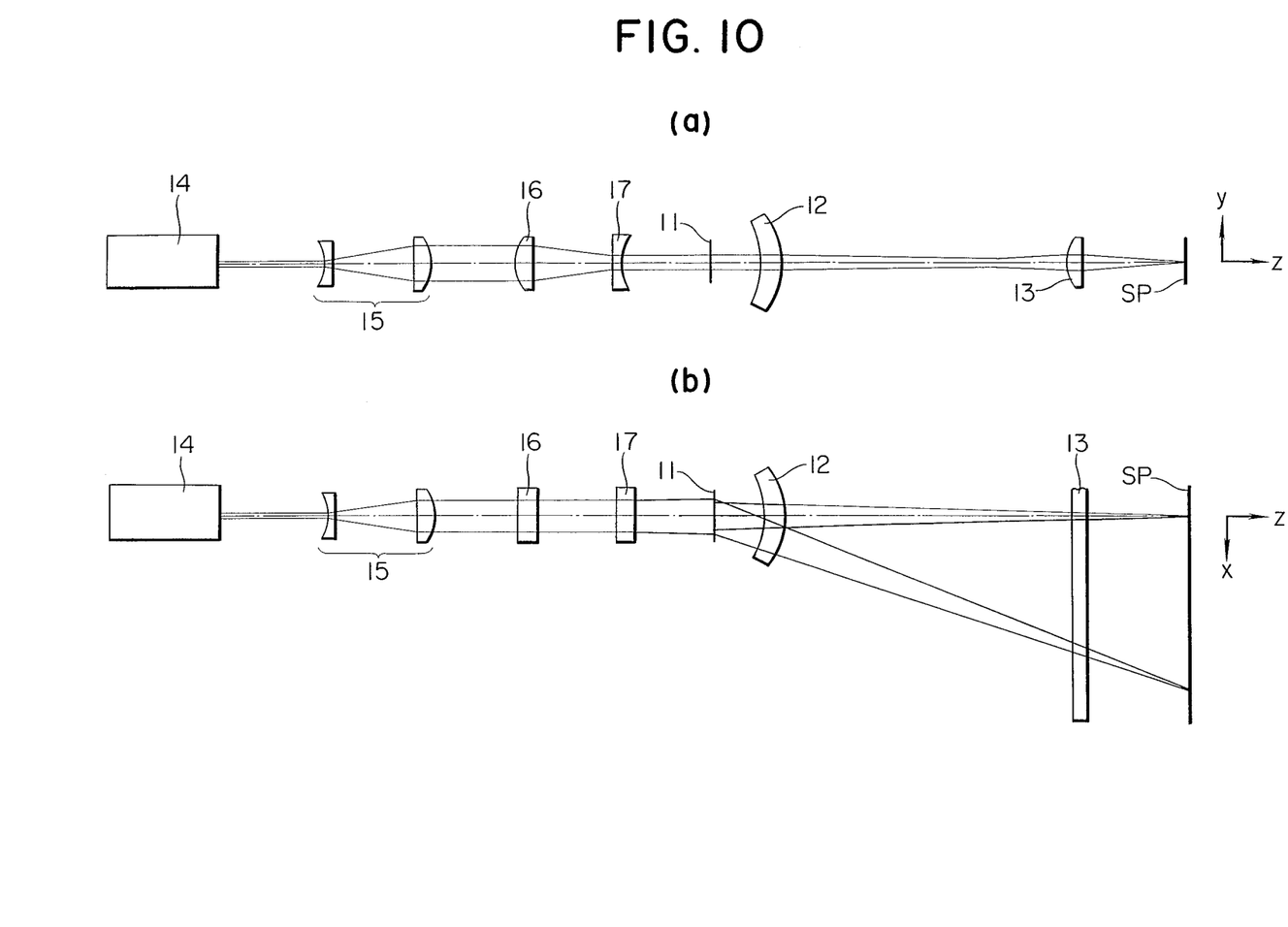
Figures 11, 12:
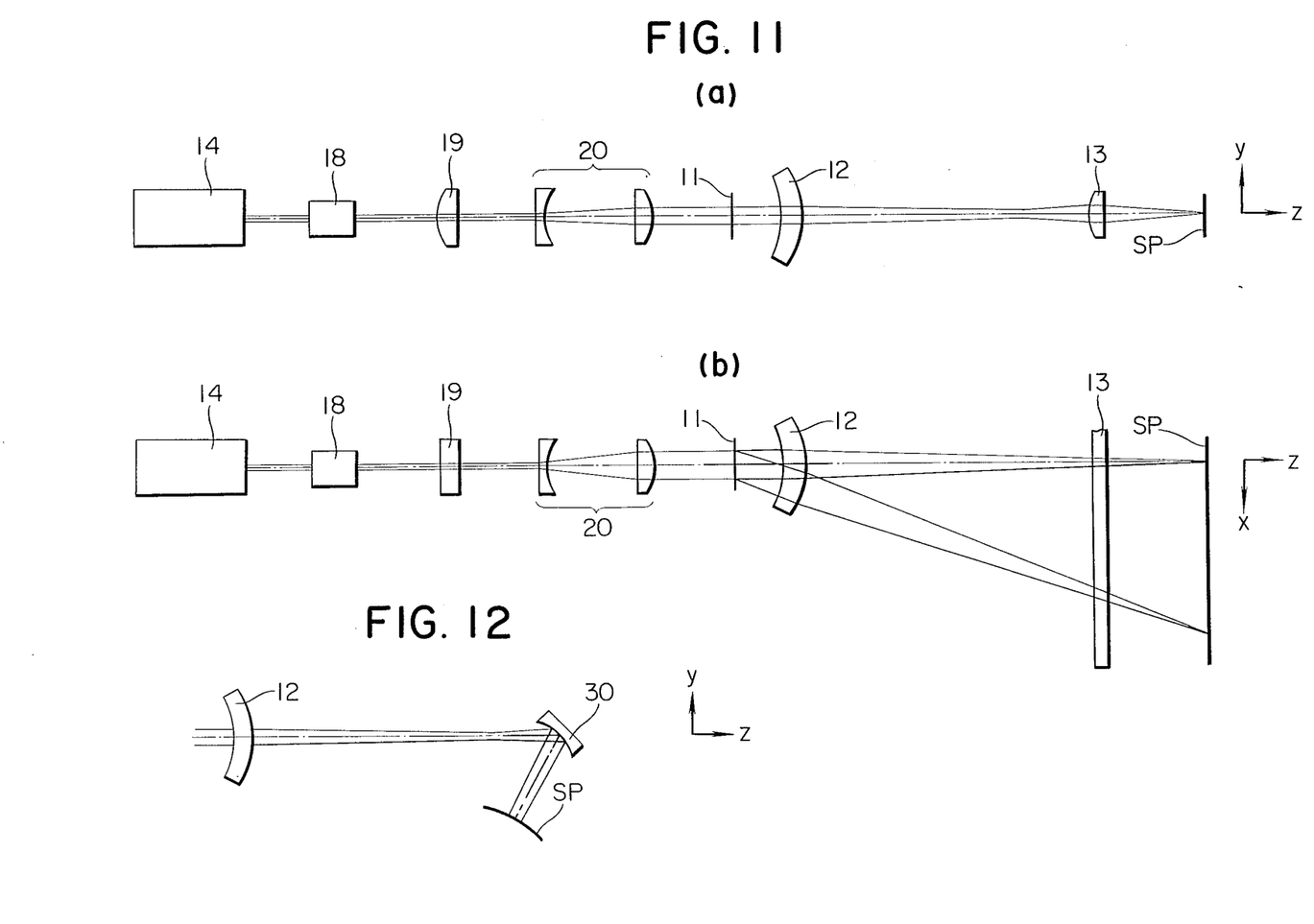
FIG. 12 is a descriptive view of another example of the present invention.

By the way, no beam shaping means was shown in FIG. 8, however, said beam shaping means may comprise, for example, as shown in FIG. 9 and FIG. 10, a light-beam expanding means 15 comprising spherical lenses receiving laser beam emitted from laser 14, a long-focus cylindrical lens 16 to which the laser beams fall in after passing through the beam expanding means 15, and a short-focus cylindrical lens. Also, as shown in FIG. 11, it is possible to comprise a single cylindrical lens 19 receiving laser beams emitted from laser 14 through a modulator 18 and a beam expanding means 20 comprising spherical lenses to which the laser beams fall in after passing through cylindrical lens 19. The reason why light-beams are made incident into rotatable polygon mirror 11, in form of such a light beam as mentioned above, is that an optical path length is not too lengthened because of the facts that the radius of the wavefront curvature of a light-beam in the direction y has to be extremely large to be incident upon rotatable polygon mirror 11 and that the light-beam span radius in y direction must be narrow. Further, in FIG. 8, etc., a cylindrical lens was used to serve as an optical element having the convergent effect in only one direction, and besides, concavewise cylindrical reflecting mirror 30 may also be used as shown in FIG. 12.

As has been described above, in the invention, the reflecting surface of a rotatable polygon mirror and a surface being scanned are conjugated geometric-opticswise each other with respect to the direction of y through an optical system comprising a flat field lens and a cylindrical lens, and thereby, the pitch of scanning is protected from causing the disorder thereof by the tilting angle error of the rotatable polygon mirror and, at the same time, a beam-waist in the direction of y determined waveopticswise is formed between the condenser lens and the cylindrical lens or the like, and thereby, the sizes of spots are uniformed on the surface being scanned. The invention has been accomplished consequently by also utilizing the fact that the convergence and divergence of a light beam are determined waveopticswise in contrast with the fact as described above that the forward direction of the main rays of a light beam is determined geometric-opticswise. In accordance with the invention, it is also possible to use a rather inaccurate and inexpensive rotatable polygon mirror, and it is not necessary to use any expensive toroidal lens. Therefore, it is possible to constitute a device having an relatively excellent performance at a relatively lower cost.

What is claimed is:

1. A light beam scanning apparatus comprising a light source for emitting a light beam, a rotatable polygon mirror having at least one first surface for reflecting said light beam to a second surface being scanned, a flat field lens provided between said polygon mirror and said second surface, an optical system provided close to said second surface, said optical system having a light converging effect only in the vertical direction perpendicular to the scanning direction, said light beam being constituted to form a first beam waist between said flat field lens and the optical system, and a second beam waist substantially on said second surface.

2. The light beam scanning apparatus of claim 1 wherein said flat field lens and said optical system being designed to place said first surface and said second surface in substantially conjugated relation with regard to said vertical direction.

3. The apparatus of claim 1 further comprising a light beam shaping means provided between said light source and said polygon mirror, whereby the light beam becomes wide and flat in the direction parallel to the scanning direction.

4. The apparatus of claim 3 wherein said light beam is a laser beam.

5. The apparatus of claim 3 wherein said optical system is a cylindrical lens or a concave reflecting mirror whose convergent effect on said light beam is uniformly extended over the scanning direction.

6. The apparatus of claim 4 wherein said optical system is a cylindrical lens or a concave reflecting mirror whose convergent effect on said light beam is uniformly extended over the scanning direction.

7. The apparatus of claim 1 wherein said light beam is a laser beam.

8. The apparatus of claim 1 wherein said optical system is a cylindrical lens or a concave reflecting mirror whose convergent effect on said light beam is uniformly extended over the scanning direction.

9. The apparatus of claim 3 wherein said light beam shaping means comprises, from the light source side, light expanding means comprising two spherical lenses, a long focus cylindrical lens, and a short forces cylindrical lens.

10. The apparatus of claim 3 wherein said light beam shaping means comprises, from the light source side, a single cylindrical lens, and light expanding means comprising two spherical lenses.

11. The apparatus of claim 7 wherein said optical system is a cylindrical lens or a concave reflecting mirror whose convergent effect on said light beam is uniformly extended over the scanning direction.

12. The apparatus of claim 4 wherein said light beam shaping means comprises, from the light source side, light expanding means comprising two spherical lenses, a long focus cylindrical lens, and a short focus cylindrical lens.

13. The apparatus of claim 3 wherein said light beam shaping means comprises, from the light source side, light expanding means comprising two spherical lenses, a long focus cylindrical lens, and a short focus cylindrical lens.

14. The apparatus of claim 6 wherein said light beam shaping means comprises, from the light source side, light expanding means comprising two spherical lenses, a long focus cylindrical lens, and a short focus cylindrical lens.

15. The apparatus of claim 4 wherein said light beam shaping means comprises, from the light source side, a single cylindrical lens, and light expanding means comprising two spherical lenses.

16. The apparatus of claim 3 wherein said light beam shaping means comprises, from the light source side, a single cylindrical lens, and light expanding means comprising two spherical lenses.

17. The apparatus of claim 6 wherein said light beam shaping means comprises, from the light source side, a single cylindrical lens, and light expanding means comprising two spherical lenses.

18. A light beam scanning method comprising providing a light beam source, a rotatable polygon mirror having at least one first surface, a flat field lens between said polygon mirror and a second surface, and an optical system close to said second surface, emitting a light beam toward said first surface, changing a light beam radius and a wavefront radius so that a first beam waist is formed between said flat field lens and said optical system, and a second beam waist is formed substantially on said second surface, scanning said second surface by rotating said polygon mirror, whereby a substantially uniform spot size of said light beam is obtained along a scanning line.

* * * * *